United States Patent
Choi et al.

(10) Patent No.: US 9,864,095 B2
(45) Date of Patent: Jan. 9, 2018

(54) MULTIPLEXED MICROVOLT SENSOR SYSTEMS

(71) Applicant: Halliburton Energy Services, Inc., Houston, TX (US)

(72) Inventors: Han-Sun Choi, Houston, TX (US); Tasneem A. Mandviwala, Katy, TX (US); David Andrew Barfoot, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 15/111,922

(22) PCT Filed: Jun. 17, 2015

(86) PCT No.: PCT/US2015/036121
§ 371 (c)(1),
(2) Date: Jul. 15, 2016

(87) PCT Pub. No.: WO2016/204738
PCT Pub. Date: Dec. 22, 2016

(65) Prior Publication Data
US 2017/0146685 A1    May 25, 2017

(51) Int. Cl.
*G01V 8/16*    (2006.01)
*E21B 47/10*    (2012.01)
(Continued)

(52) U.S. Cl.
CPC .............. *G01V 8/16* (2013.01); *E21B 47/102* (2013.01); *G01L 1/247* (2013.01); *G01D 5/3539* (2013.01)

(58) Field of Classification Search
CPC .. G01V 8/16; G01V 8/02; H04J 14/08; H04B 10/27; E21B 43/26; G01L 1/241;
(Continued)

(56) References Cited

U.S. PATENT DOCUMENTS

| 4,725,141 | A | * | 2/1988 | Georgiou | .................. | G01J 9/02 |
| | | | | | | 250/227.27 |
| 5,062,153 | A | | 10/1991 | Turpin et al. | | |

(Continued)

FOREIGN PATENT DOCUMENTS

| CH | WO/99/24790 | * | 5/1999 | ............. | G01D 5/353 |
| CH | WO/2014/089505 | * | 6/2014 | ............. | E21B 47/00 |

(Continued)

OTHER PUBLICATIONS

Halliburton Data Sheet for TDI-7000, TDM Fiber Interrogator, Rev. E, 2013.
(Continued)

*Primary Examiner* — Michael P Lapage
(74) *Attorney, Agent, or Firm* — McDermott Will & Emery LLP

(57) ABSTRACT

Multiplexed microvolt sensor systems and methods are described. An example system may include a pulsed light source, a first optical waveguide segment operatively coupled to the pulsed light source, an optical circulator including a first port, a second port, and a third port, the first port being operatively coupled to the first optical waveguide segment, a second optical waveguide segment operatively coupled to the second port of the optical circulator, and an array of sensor elements. Each of the sensor elements may include a detector and an electro-optical modulator, the electro-optical modulator being operatively coupled to the second optical waveguide segment. The example system may further include a third optical waveguide segment operatively coupled to the third port of the optical circulator, a compensating interferometer operatively coupled to the third optical waveguide segment, and a time division multiplexed demodulator operatively coupled to the compensating interferometer and the pulsed light source.

15 Claims, 5 Drawing Sheets

(51) Int. Cl.
*G01L 1/24* (2006.01)
*G01D 5/353* (2006.01)

(58) Field of Classification Search
CPC .... G01L 1/242; G01B 11/165; G01D 5/3539; G01D 5/35387
See application file for complete search history.

(56) References Cited

U.S. PATENT DOCUMENTS

| | | | |
|---|---|---|---|
| 5,898,517 A * | 4/1999 | Weis | E21B 47/123 356/32 |
| 5,946,429 A * | 8/1999 | Huang | G01J 9/02 250/227.14 |
| 6,374,913 B1 | 4/2002 | Robbins et al. | |
| 6,778,720 B1 | 8/2004 | Cekorich et al. | |
| 2002/0196993 A1* | 12/2002 | Schroeder | G01L 1/246 385/12 |
| 2006/0076476 A1* | 4/2006 | Thingbo | G01D 5/3539 250/227.23 |
| 2008/0068586 A1* | 3/2008 | Kishida | G01B 11/18 356/32 |
| 2009/0224936 A1 | 9/2009 | Vannuffelen et al. | |
| 2009/0316158 A1* | 12/2009 | Ash, III | G01N 21/45 356/450 |
| 2011/0139447 A1 | 6/2011 | Ramos et al. | |
| 2012/0147381 A1 | 6/2012 | LeBlanc et al. | |
| 2012/0278043 A1* | 11/2012 | Lewis | G01D 1/00 702/189 |
| 2014/0139226 A1 | 5/2014 | Jaaskelainen et al. | |
| 2015/0162986 A1* | 6/2015 | Campos | H04B 10/27 398/70 |

FOREIGN PATENT DOCUMENTS

| | | |
|---|---|---|
| WO | 99/24790 A1 | 5/1999 |
| WO | 2015/030822 A1 | 3/2015 |
| WO | 2015/130300 A1 | 9/2015 |
| WO | 2016/018280 A1 | 2/2016 |

OTHER PUBLICATIONS

Bush et al., Low-Cost Interferometric TDM Technology for Dynamic Sensing Applications, SPIE, OpticsEast 2004, Fiber Optic Sensor Technology and Applications III, paper 5589-19.

Mochizuki, Kiyofumi, Degree of Polarization in Jointed Fibers: the Lyot Depolarizer, Applied Optics, vol. 23, No. 19, 1934.

International Search Report and Written Opinion for PCT/US2015/036121 dated Feb. 15, 2016.

Search Report received in corresponding Irish Application No. 2016/0149, dated Jul. 22, 2016.

* cited by examiner

MULTIPLEXED MICROVOLT SENSOR SYSTEMS

BACKGROUND

Subterranean reservoirs may change over time due to various conditions including geological issues and treatments performed relative to the reservoir. Such changes may impact the reservoir and the surrounding formation. For example, hydrocarbon recovery treatments may be enhanced by injecting water or steam into a reservoir. In such instances, it may be useful to monitor injection of water or steam, as well as other fluids into a subterranean formation, and/or to monitor progress of such fluids toward or away from one or more wellbores in the reservoir.

BRIEF DESCRIPTION OF THE DRAWINGS

The following figures are included to illustrate certain aspects of the present disclosure, and should not be viewed as exclusive embodiments. The subject matter disclosed is capable of considerable modifications, alterations, combinations, and equivalents in form and function, without departing from the scope of this disclosure.

DETAILED DESCRIPTION

Figure 1:
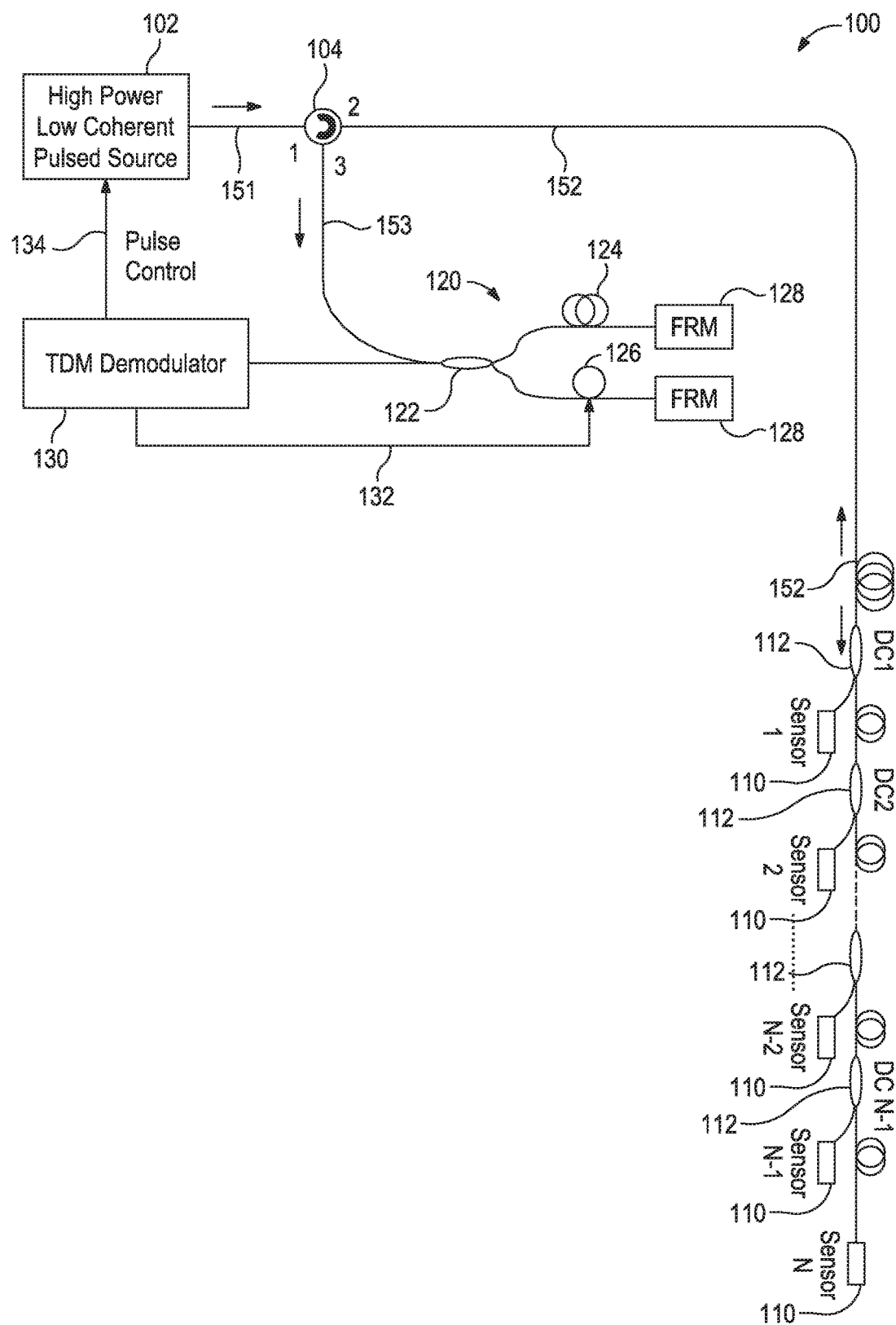
FIG. 1 is a diagram of an example multiplexed microvolt sensor system in accordance with aspects of the present disclosure.

The present disclosure generally relates to multiplexed microvolt sensor systems, and more particularly, to multiplexed microvolt sensor systems using electro-optical modulators and methods of using the same.

Systems and methods are described herein to measure an electromagnetic field proximal to a downhole area in a well (e.g., within the downhole or secured adjacently in the wellbore external to a casing or liner). For example, an emitter may emit an electromagnetic field and that field may be attenuated by the surrounding subterranean formation (e.g., rock, water, hydrocarbons, etc.). The attenuated electric field may be received or sensed by a detector in a sensing element. For example, if there happens to be water present, the attenuation of the electric field will change as compared to if rock is present. Thus, by analyzing the attenuation of the electromagnetic field, it may be determined whether fluid (e.g., water, steam, $CO_2$, etc.) is approaching the wellbore, for example. In this regard, water ingress into a wellbore may cause damage or problems with hydrocarbon production from the wellbore.

Fluid monitoring in the subterranean formation is important because as hydrocarbons are extracted from a producing well, a pressure of the reservoir may start to decrease. In this regard, a technique for increasing hydrocarbon extraction is drilling a second well strategically placed adjacent to a portion of the reservoir so that a fluid may be inserted (e.g., water, steam, $CO_2$, etc.) thereby pushing the remaining hydrocarbons in the reservoir toward the producing well. However, an operator of the producing well needs to be aware when the fluid used to push the hydrocarbons approaches the producing well and may be close to entering the wellbore. Thus, by detecting and locating fluid approaching the wellbore, for example, through a fracture network or subsurface pressure gradient, an operator may implement certain procedures (e.g., barrier insertion or diversion techniques) with respect to protecting the integrity of the producing well.

According to embodiments described herein, a detector may detect the electromagnetic field, and a corresponding signal (e.g., a voltage signal) is applied to an optical modulator of the sensing element, and thereby converting the electrical sensor signal into the optical domain. As such, the sensor signal may be transmitted optically a distance to one or more systems (e.g., an interrogation system) proximal to a surface of the well, for example. Optical waveguides (e.g., fiber) may provide one or more advantages when communicating such sensor signals to the surface as opposed to using a copper wireline tool placed into a wellhead at the surface and extends downhole to measure an electric field. For example, using optical fiber as the transmission medium may provide the advantage of low loss and tolerance to environmental conditions such as, but not limited to high temperatures. Additionally, another advantage of the multiplexed microvolt sensor systems disclosed herein is that production of the well need not be stopped in order to detect whether a waterfront is approaching or proximal to the wellbore (e.g., no disruptive intervention is required in order to take measurements as is necessary with some copper wireline tools that measure electromagnetic fields downhole).

In accordance with certain aspects, a detector or sensor (e.g., an electromagnetic field sensor) may be disposed adjacent to a downhole area. A signal that the detector or sensor is recording or measuring may then by transmitted up to the surface of the well optically. The sensing element may be configured to modulate an optical signal based on an electrical signal applied to an electro-optical modulator (e.g., a Lithium Niobate electro-optical modulator). By coupling the detector or sensor to the electro-optical modulator, the detected electrical signal to be measured may be converted into an optical signal so that it may be propagated through an optical waveguide.

In accordance with certain aspects, the multiplexed microvolt sensor system may be used in a production environment (e.g., after drilling has been completed and the well is producing hydrocarbons). In some embodiments, many of the components are in the well and may be permanently (or semi-permanently) installed therein. For example, the multiplexed microvolt sensor system may be permanently installed with a producing well, and may be configured to provide continuous readings or measurements. Accordingly, in a time-lapse format, the multiplexed microvolt sensor system may determine whether fluid (e.g., a waterfront) is present and at what rate it is approaching the wellbore.

An optical waveguide (e.g., provided by a fiber optic cable) may extend from the surface of the well to a production zone within the wellbore. In some embodiments, a fiber cable may contain one or more fiber strands for providing the optical waveguide that extend the entire length of the cable. In some implementations, the fiber cable will be clamped or otherwise secured to the outside of the casing may be cemented into the wellbore.

Disposing the optical waveguide and sensor elements attached thereto on the outside of the casing of the well further provides an advantage in that the metallic casing will not attenuate electromagnetic signal being emitted by the emitter and received by the detector, for example.

As shown in the examples provided herein, multiplexed microvolt sensor systems may provide continuous and disruption free measurement of AC voltages proximal to a multiple downhole area so that detection of approaching fluids (e.g., a waterfront) may be determined. However, certain electro-optical modulators intrinsically have high loss that may prevent a series connection for multiplexing, and the signal intensity may vary due to polarization drift through a single mode fiber, for example. As disclosed herein, multiplexed microvolt sensor systems using electro-optical modulators (e.g., customized Lithium Niobate phase modulators) as very sensitive sensing components are described that overcome such issues.

FIG. 1 illustrates an example of a multiplexed microvolt sensor system 100. System 100 may comprise a pulsed light source 102 (e.g., a high-power, low coherent pulsed light source), an array of sensor elements 110, a compensating interferometer 120, and a time division multiplexed demodulator 130. System 100 may also comprise an optical waveguide including various segments operatively coupled to an optical circulator 104 having a first port 1, a second port 2, and a third port 3. For example, in system 100, a first optical waveguide segment 151 may be operatively coupled to the pulsed light source 102 and the first port 1 of optical circulator 104. A second optical waveguide segment 152 may be operatively coupled to the second port 2 of optical circulator 104 and operatively coupled to each sensor element 110 of the array of sensor elements 110. The second optical waveguide segment 152 and the array of sensor elements 110 may extend from a surface area of a well and extend down a side of the corresponding wellbore, for example. A third optical waveguide segment 153 may be operatively coupled to the third port 3 of optical circulator 104 and compensating interferometer 120. It should be noted that the number of optical waveguide segments that may be used is not limited to three, as discussed above, and the number of optical waveguide segments may be increased or decreased based on the power supplied to the pulsed light source 102. For instance, if the amount of power is decreased, then the number of optical waveguide segments that may be limited to one or two. Similarly, if the amount of power is increased, more than three optical waveguide segments may be used in the system 100.

Each sensor elements 110 with the exception of the last sensor element 110 (e.g., Sensor N in FIG. 1) may be operatively coupled to the second optical waveguide segment 152 via a directional coupler 112. The directional coupler 112 may split off some of the light pulse to a sensor element 110 and allow the remainder to pass to the next sensor via the second optical waveguide segment 152. For example, directional coupler 112 may provide a 10 percent tap in some implementations. The last sensor element 110 (e.g., Sensor N) in the array of sensor elements 100 may be operatively coupled to the second optical waveguide 152 via a direct connection to an end of the second optical waveguide 152.

Figure 2:
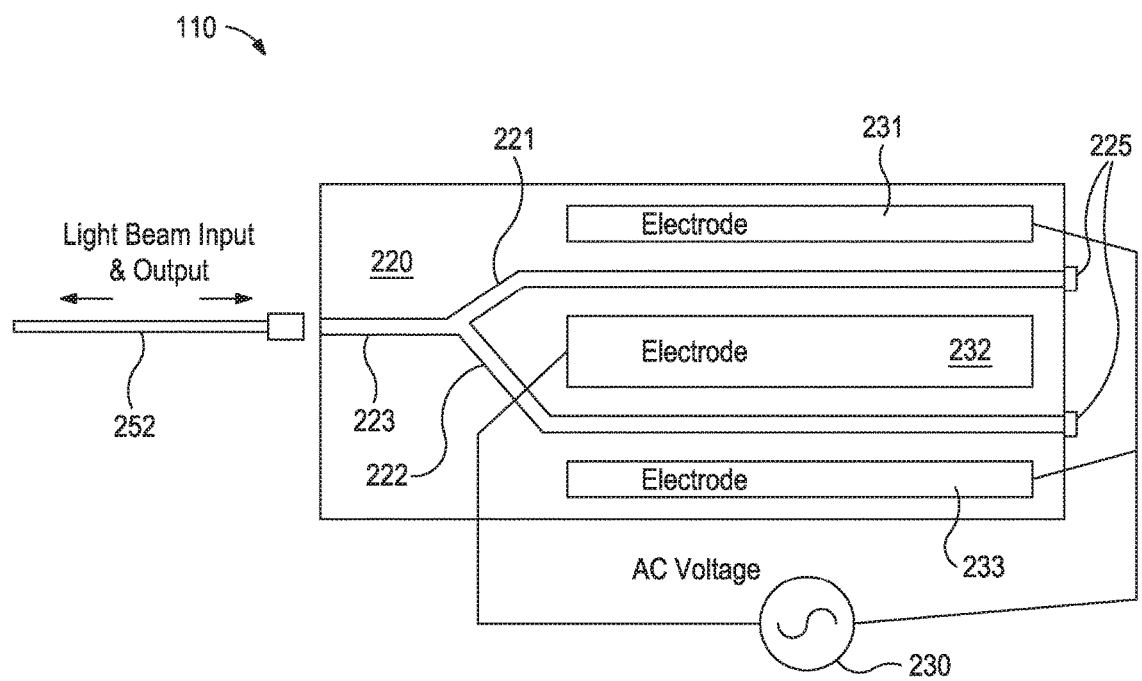
FIG. 2 is a diagram of an example sensor element of the example multiplexed microvolt sensor system in accordance with aspects of the present disclosure.

FIG. 2 illustrates an example of sensor element 110, according to one or more embodiments. The sensor element 110 may include an electro-optical modulator 220 and a detector 230. In certain embodiments, the electro-optical modulator 220 may comprise a sensing interferometer, which may be a Lithium Niobate Michelson-type interferometer. The sensor element 110 may include an ingress/egress waveguide channel 223 that may have a proximal end with respect to the pulsed light source 102 (FIG. 1) and a distal end may connect to a proximal end of a first waveguide channel arm 221 and a proximal end of a second waveguide channel arm 222. The proximal end of the ingress/egress waveguide channel 223 may be operatively coupled to an optical waveguide path 252 extending from the directional coupler 112 (FIG. 1) for coupling to the second optical waveguide segment 152.

A first reflective element 225 may be disposed at a distal end of the first waveguide channel arm 221 and a second reflective element 225 may be disposed at a distal end of the second waveguide channel arm 222. In certain embodiments, the first and second reflective elements 225 may be mirrors that may be coated with gold for signal strength.

In accordance with certain embodiments, the second waveguide channel arm 222 may be longer than the first waveguide channel arm 221. For example, a distance by which the second waveguide channel arm 222 may be longer than the first waveguide channel arm 221 may be between 0.1 mm and 5.0 mm in some implementations.

The detector 230 may be configured to sense an electromagnetic field, and may be, for example, a coil of electrically conductive material. In some implementations, the coil may be formed of ferromagnetic material. However, the detector 230 may be any other electromagnetic field pickup device in accordance with other implementations. The detector 230 may receive a sinusoidal signal of the electromagnetic field and provide the sinusoidal signal to the electrodes of the electro-optical modulator 220. For example, the electro-optical modulator 220 may include a first electrode 231, a second electrode 232, and a third electrode 233. The first waveguide channel arm 221 may be disposed between the first electrode 231 and the second electrode 232. The second waveguide channel arm 222 may be disposed between the second electrode 232 and the third electrode 233. Moreover, in certain embodiments, the first electrode 231 and the third electrode 233 may be electrically coupled to a first end of the detector 230, and the second electrode 232 may be electrically coupled to a second end of the detector 230. However, other arrangements of the electrodes and waveguide channel arms of the electro-optical modulator 220 are may be utilized by one of skill in the art given the benefit of the present disclosure.

Referring back to FIG. 1, compensating interferometer 120 may comprise a 2×2 directional coupler 122 for providing a compensating path difference that may be approximately equal to a path difference in the electro-optical modulator 220 (e.g., the sensing interferometer) corresponding to the first waveguide channel arm 221 and the second waveguide channel arm 222. For example, a first compensating waveguide path 124 may be provided by a length of fiber. The first compensating waveguide path 124 may include a reflector 128 (e.g., a faraday rotator mirror (FRM)). A second compensating waveguide path 126 may comprise a phase modulator. The phase modulator may include a loop of the fiber providing the waveguide path that may be wrapped around a piezoelectric disk, in accordance with certain embodiments. The second compensating waveguide path 126 may also include a reflector 128 (e.g., an FRM).

In this regard, in order to match the optical path difference (OPD) of the matching fiber length providing the first compensating waveguide path 124 in the compensating interferometer 120 with the difference between channel arm lengths of the first waveguide channel arm 221 and the second waveguide channel arm 222 in the electro-optical modulator 220, a device to modulate optical paths may be used. For example, because the compensating interferometer 120 may be required to be precise in certain implementations, splicing the fiber strands to be exactly precise so that the difference between the first compensating waveguide path 124 and the second compensating waveguide path 126 matches the corresponding path mismatch between the first waveguide channel arm 221 and the second waveguide channel arm 222 may prove challenging. Thus, a device (not shown) may be utilized to modulate optical paths up to several millimeters with just an applied voltage to fine-tune the length of the first compensating waveguide path 124, for example. Thus, fibers in the optical path difference matching fiber strand may be cut to within a centimeter of the matching distance, and the device to modulate the optical path of the first compensating waveguide path 124 may be used to further match the difference between the first waveguide channel arm 221 and the second waveguide channel arm 222 to be within a 1 mm difference. In some implementations, the device to obtain the near exact path mismatch may include another (second) fiber wound piezoelectric tube inserted at least partially in the first compensating waveguide path 124. In this regard, the optical path difference matching fiber may provide a calibration step in order to fine-tune the path mismatch distance in the compensating interferometer 120 to be approximately the same as the first waveguide channel arm 221 and the second waveguide channel arm 222 of the electro-optical modulator 220.

The time division multiplexed demodulator 130 may be operatively coupled to the compensating interferometer 120 and the pulsed light source 102. For example, time division multiplexed demodulator 130 may generate driving pulses (e.g., pules control 134) for the pulsed light source 102. The time division multiplexed demodulator 130 may also provide a phase generated carrier (PGC) control signal 132 for compensator modulation of the compensating interferometer 120 (e.g., by controlling a phase modulator of the second compensating waveguide path 126).

In certain embodiments, pulsed light source 102 may be a high-power, low-coherent pulsed light source. As used herein, high-power may refer to power sources equal to or greater than 100 mW, and a low-coherent source may refer to a light source that may emit broadband optical radiation based on superluminescence. For instance, these may include Light Emitted Diodes (LEDs), Superluminescent Diodes (SLDs), sources of Amplified Spontaneous Emission (ASEs), or other light source that may have a coherence length of about tens of micrometers. One or more of these light sources may utilize a semiconductor optical amplifier as a switch.

Moreover, in some embodiments, pulsed light source 102 may comprise a polarization element, for example, a Lyot depolarizer or a polarization switcher, to avoid signal fading due to polarization drift. It may be noted that the state of polarization (SOP) in a single-mode fiber may randomly drift while a beam propagates through the length of fiber. If input beam may be linearly polarized and the axis thereof may be orthogonal to the Lithium Niobate waveguide axis, total signal fading may occur.

In some embodiments, a Lyot depolarizer may be used at the source launching side (e.g. coupled to or integrated with an output of the pulsed light source 102) to make the launching light a depolarized light. If the depolarized state of the beam may be preserved at the input of the electro-optical modulator 220 comprising the Lithium Niobate Michelson-type sensing interferometer, total fading may be avoided since half of the optical power may always be coupled to the electro-optical modulator 220. In other embodiments, source polarization switching between the orthogonal linear polarizations may be employed. In embodiments using source polarization switching, non-fading at least one of the two SOPs may result, but system signal bandwidth may drop to half, and may require customization of the one or more optoelectronic semiconductor devices (e.g., superluminescent diodes) with a polarization maintaining fiber (PMF) pigtail, for example.

It is to be understood that in some embodiments, a combination of surface equipment of system 100 (e.g., pulsed light source 102, compensating interferometer 120, and/or time division multiplexed demodulator 130) may be included as part of an interrogator system. In this regard, interrogation may be performed by transmitting light pulses into the optical waveguide and to the array of sensor elements 110 array, and collecting the reflected, time-separated optical return signals. The reflected, time-separated optical return signals may then be processed to precisely measure optical phase changes associated with the electro-optical modulator 220, which correspond to change in a voltage of the electromagnetic field detected by detector 230, for example.

Figure 3:
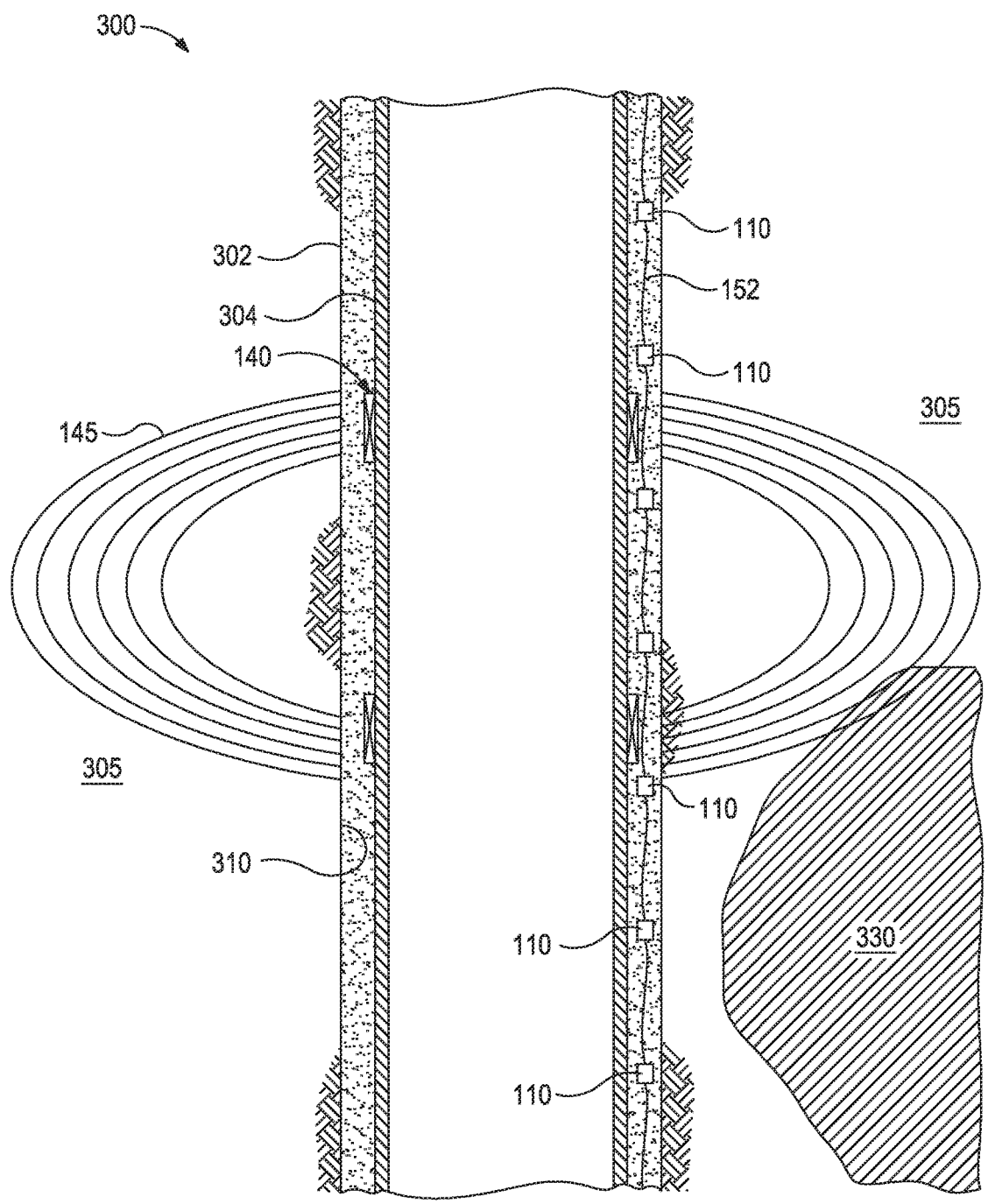
FIG. 3 is a diagram of an example well system including a multiplexed microvolt sensor system in accordance with aspects of the present disclosure.

FIG. 3 is an example of a well system 300 including the multiplexed microvolt sensor system 100. A well as used herein with respect to well system 300 may be, but is not limited to, an oil and gas well. In some implementations, well system 300 may include a drilling rig, semi-submersible platform, or fixed platforms, for example.

In accordance with certain embodiments, the multiplexed microvolt sensor system 100 may further comprise an emitter 140 that may be used to emit electromagnetic energy having an electromagnetic field including electric and magnetic field components. In this regard, electromagnetic fields 145 may be induced in the subterranean formation 305. However, it is to be understood that aspect of the disclosure are not limited to any particular way of inducing electromagnetic fields in the subterranean formation 305.

The array of sensor elements 110 may be operatively coupled to a portion of the optical waveguide extending down wellbore 310 (e.g., the second optical waveguide segment 152 with respect to FIG. 1). For example, the array of sensor elements 110 may be disposed proximal to an exterior of a casing 304 of the wellbore 310. For example, a portion of the fiber cable for providing the optical waveguide along with at least some of the sensor elements 110 may be clamped or otherwise secured to an exterior surface of the casing 304. Additionally or alternatively, a portion of the fiber cable for providing the optical waveguide along with at least some of the sensor elements 110 may be cemented 302 into the wellbore 310 proximal to the exterior surface of the casing 304. Similarly, if a liner is utilized to extend support of the wellbore 310, the array of sensor elements 110 may be disposed proximal to an exterior of the liner (e.g., fastened or secured thereto).

In certain embodiments, time division multiplexing scheme may be used to communicate with each sensor element 110 in the array. For example, a light pulse may be transmitted along the optical waveguide (e.g., the second optical waveguide segment 152), and over time, each sensor element 110 reflects back its corresponding signal with the distance to each sensor element 110 being related to the time delay before a response from the reflection is received. As such, in certain embodiments, the optical waveguide segment may provide a single optical path. For example, a single fiber stand or optical path may be used for optical transmission of the downwardly-propagating light pulses and the upwardly-propagating reflected, time-separated optical return signals for at least a portion of the optical waveguide extending between the first sensor element 110 and the last sensor element 110. As such, utilizing the low coherence interferometry schemes described herein, multiple sensor elements 110 (e.g., 10 to 20 sensor elements 110) may be operable on a single fiber strand or optical path.

However, in other embodiments, one or more additional sensors may be added by utilizing wavelength division multiplexing techniques. For example, wavelength division multiplexing may be employed using different wavelengths of light (e.g., utilizing multiple lasers and downhole optical filters).

In some implementations, the array of sensor elements 110 operatively coupled to the downhole optical waveguide extends a distance greater than 1,500 meters. Moreover, a distance between each sensor element 110 in the array of sensor elements 110 may be between 10 meters and 50 meters. In accordance with certain aspects, the forward propagation of light in a standard fiber may be such that a light pulse will propagate approximately 1 meter in 5 nanoseconds. In some implementations, for example, each light pulse transmitted from pulsed light source 102 may be a 100 nanoseconds pulse (e.g., a pulse width of approximately 20 meter). In certain embodiments, the pulse width of the light pulse to transmit to the optical waveguide extending down the wellbore 310 may be configured such that the light pulse may not reach and bounce off two consecutive sensor elements 110 at the same time.

For example, if each sensor element 110 in the array is 100 meters apart, then the pulse width of the light pulse may be larger than 20 meters, but less than 100 meters in accordance with certain embodiments. An advantage of sending a bigger pulse is that more optical energy may be reflected back resulting in a more sensitive measurement. In accordance with certain embodiments, after a first light pulse is transmitted, a second light pulse may not be transmitted until the returning/reflected optical signals from the first light pulse are received.

However, in some embodiments in which more rapid measurements are desired, a second light pulse may be transmitted such that the second light pulse arrives proximate to the first sensor element 110 when the return/reflected optical signals from the first light pulse arrive at the first sensor element 110. In this regard, the lead-in fiber length to get to the first sensor element 110 (e.g., the fiber length from the optical circulator to the first sensor element 110) may not need to be considered for determining an interval between successive light pulses, in some embodiments. Only the time it takes for a light pulse to propagate from the first sensor element 110 to the last sensor element 110, and the returning/reflected optical signals from the last sensor element 110 to the first sensor element 110 may be required to determine an appropriate interval between successive light pluses, in some embodiments. For example, if the distance between the first sensor element 110 and the last sensor element 110 may be 1 km, the interval between successive light pluses may be 10 microseconds or greater (e.g., 5 nanoseconds× 1000 meters from the first sensor element 110 to the last sensor element 110 and 5 nanoseconds×1000 meters from the last sensor element 110 to the first sensor element 110), in accordance with some embodiments.

In this regard, each sensor element 110 may be determined by identifying the time delay associated with each returning/reflected optical signal of a portion of the input light pulse back to a photodetector in the time division multiplexed demodulator 130. In this regard, the photodetector in the time division multiplexed demodulator 130 may receive each returning/reflected optical signal subject to its location in the array of sensor elements 110. It is to be appreciated, however, that well system 300 is not limited to any interval distance or number of sensor elements 110 in the array.

Figure 4:
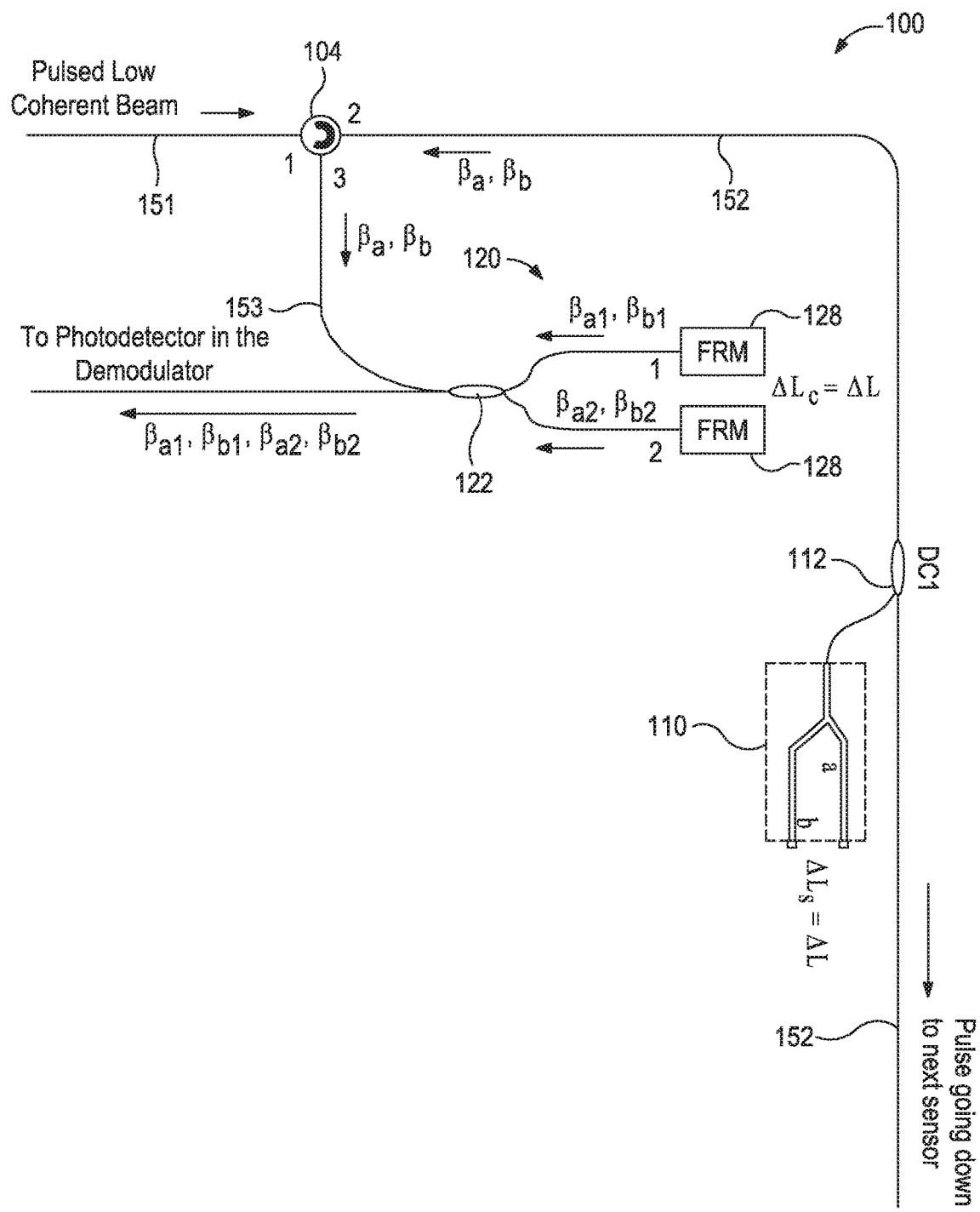
FIG. 4 is a diagram of a portion of the example multiplexed microvolt sensor system illustrating an example of propagated light pulses the in accordance with aspects of the present disclosure.

FIG. 4 illustrates a portion of the multiplexed microvolt sensor system 100 shown in FIGS. 1 and 2, and further shows example propagation paths of light pulses or beams in accordance with aspects of the disclosure.

In accordance with certain aspects, system 100 may employ time division multiplexed, low coherence interferometry techniques. For example as noted herein, each sensor element 110 of the array of sensor elements may comprise an electro-optical modulator 220 that may include a Lithium Niobate Michelson-type interferometer. An optical path difference of the first waveguide channel arm 221 and the second waveguide channel arm 222 may range from hundreds of micrometers to a few millimeters. The path lengths of each of the two channel arms 221, 222 may be a few centimeters. In some implementations, the longer the two channel arms 221, 222, the more sensitive the electro-optical modulator 220. The compensating interferometer 120 may have an optical path difference that may be matched to that of the electro-optical modulator 220. In accordance with certain aspects, the coherence length of the pulsed light source 102 (e.g., superluminescent diode) may be shorter than a path difference of a sensing interferometer portion of the electro-optical modulator 220. However, the coherence length of the pulsed light source 102 may be longer than a path difference matching error of the compensating interferometer 120 and the path difference of the sensing interferometer. This relationship with respect to the coherence length may be expressed as follows:

$$|\Delta L_S - \Delta L_C| = \Delta(\Delta L_S) < l_c < \Delta L_S$$

Where $l_C$ is the coherence length of the pulsed light source 102, $\Delta L_S$ is the path difference of sensing interferometer of the electro-optical modulator 220, and $\Delta L_C$ is the path difference of compensating interferometer 120.

For an N sensor element time division multiplexed scheme, the array of sensors 110 may be formed by N−1 tap directional couplers (DC) 112 of different tap ratios. Neglecting coupler losses, DC1 112 may have 1/N tap power and (N−1)/N transmission power, DC2 112 may have 1/(N−1) tap power, etc. The last DC(N−1) 112 may have ½ tap power and ½ transmission power to balance the returning pulse train, for example. Micro voltages detected by the detector 230 may be converted to optical phase by the electro-optical modulator 220. The optical signal phase may be converted to voltage readings by the time division multiplexed demodulator 130.

For example, when a sinusoidal AC voltage may be applied proximal to the first waveguide channel arm 221 and the second waveguide channel arm 222 by the first electrode 231, the second electrode 232, and the third electrode 233, the optical path change for the two channel arms may be complementary (e.g., when one of the first waveguide channel arm 221 or the second waveguide channel arm 222 length increases, the other decreases due to the opposite voltages applied to the two channel arms by the electrodes connected to the detector 230.

In accordance with low coherence interferometry aspects of system 100, the coherence length, $l_c$, of pulsed light source 102 with ΔΛ bandwidth may be expressed as:

$$l_c = k \frac{\lambda^2}{\Delta \lambda}$$

Where λ is pulsed light source 102 center wavelength, k is a coefficient depending on the pulsed light source 102 profile (e.g., a probability density function of the pulsed light source 102). In accordance with certain implementations, pulsed light source 102 coherence length and optical path difference (OPD) of the sensing and compensating interferometers, a 1550 nm superluminescent diode source with 30 nm full width half max (FWHM) bandwidth and Gaussian approximated density function (k=0.664) may have approximately a 53.2 micrometer coherence length.

With reference to FIG. 4, the two channel arms of the sensing interferometer of sensor element 110 may be identified as channel arm 'a' and channel arm 'b'. The compensating interferometer 120 may by identified as compensating waveguide path '1' and compensating waveguide path '2'. In certain aspects, channel arm 'b' and compensating waveguide path '2' may be longer than channel arm 'a' and compensating waveguide path '1', and their differences are both ΔL (e.g., matched). When a light pulse may be reflected or bounced by the two reflective elements 225 of the electro-optical modulator 220 (FIG. 2), two different returning beams of different paths are generated. These two returning beams may be identified as $B_a$ and $B_b$ and may be propagated to the compensator interferometer 120 via DC1 120, optical circulator 104, and the 2×2 directional coupler 122. Both $B_a$ and $B_b$ may be reflected again by the two reflectors 128 of the compensating interferometer 120, which thereby generates four different beams of different paths.

Optical path differences of all possible combinations of returning beam couples out of the four different returning beams comparing to the source coherence length are provided in Table I below:

TABLE I

Optical path differences between two returning beams of the four returning beams.

| Two Beams Out of 4 | OPD | OPD < $l_c$? (Or Beams Interfere?) |
|---|---|---|
| $B_{a1}$ and $B_{b1}$ | ΔL | No |
| $B_{a1}$ and $B_{a2}$ | ΔL | No |
| $B_{a1}$ and $B_{b2}$ | 2 · ΔL | No |
| $B_{b1}$ and $B_{a2}$ | 0 | Yes |
| $B_{b1}$ and $B_{b2}$ | ΔL | No |
| $B_{a2}$ and $B_{b2}$ | ΔL | No |

With reference to Table I, only optical path difference matched returning beam couple, $B_{b1}$ and $B_{a2}$, may interfere thereby delivering the optical sensor signals to the time division multiplexed demodulator 130 (or interrogator). The other returning beam couples (or pairs) may not interfere since the optical path differences may be longer than the coherence length of the pulsed light source 102 (e.g., high-power, low-coherent pulsed light source).

Certain embodiments of the multiplexed microvolt sensor system 100 provide optical phase shifts of approximately pi radians with a voltage change applied to the modulator of approximately one volt. As such, approximately three-radian phase shift may correspond to a 1 volt change in the detector 230. The time division multiplexed demodulator 130 may have a sensitivity of better than 100 micro radians per meter per root Hertz for certain frequencies. Thus, small voltages may be sensed by the system 100. For example, in terms of an AC sinusoidal voltage signal detected by the sensor element 110, amplitude of the voltage signal may be detected and determined in the tens of microvolts.

In this regard, as described herein, emitter 140 may emit an electromagnetic field having a sinusoidal amplitude such that if fluid (e.g., water, steam, $CO_2$, etc.) may be present, the amplitude of the electromagnetic field (e.g., electromagnetic field 145 (FIG. 3)) may attenuate differently and may be received and sensed by one or more sensor elements 110 of the array of sensor elements 110. The voltages provided by the detector 230 may be small. However, with such a small voltage, a typical sensor element 110 may typically not have an ability to drive that small voltage signal over a long distance. Thus, if that detected small voltage signal were to be electrically connected to the surface (e.g., using a copper line downhole through a well head), the detected voltage signal would likely not be discernible as being lost in background noise.

Thus, it is to be appreciated that by modulating the detected voltage signal with the electro-optical modulator 220, the detected voltage signal may be converted into an optical phase change signal, at which point the signal information will be transmitted optically via the optical waveguide with low loss (e.g., on the order of 0.2 dB per kilometer for a single mode fiber).

Methods and techniques for sensing a voltage in the microvolt range are described with respect to FIG. 4 as well as FIGS. 1 through 3. However, it is to be understood that the operations in the described method may be used in conjunction with other methods/processes and aspects of the disclosure described herein. Although certain aspects of the method are described with relation to the example embodiments provided in FIGS. 1-4, the method is not limited to such.

An example method may comprise emitting an electromagnetic field into a subterranean formation for detection by a sensor element. The sensor element may be coupled to an optical waveguide that extends down a wellbore (e.g., wellbore 310 of FIG. 3). A light pulse may be transmitted via the optical waveguide toward the sensor element. A high-power, low-coherent pulsed light source having a coherence length that may be shorter than a path difference of a sensing interferometer of a sensor element, and that may be longer than a path difference matching error of a compensating interferometer (e.g., compensating interferometer 120 of FIGS. 1 and 4) and the path difference of the sensing interferometer, may be used to transmit the light pulse.

The method may further comprise receiving two return light pulses via the downhole optical waveguide from the sensor element. The two return light pulses may be modulated based on detection of the electromagnetic field by the sensor element. The method may further include directing the two return light pulses to the compensating interferometer, for example, via an optical circulator to the compensating interferometer. The compensating interferometer may have two optical waveguide paths and two mirror assemblies for reflecting the two return light pulses. Thus, the method may further comprise receiving four compensated return light pulses from the compensating interferometer.

The method may further comprise determining a signal of the sensor element based on the four compensated return light pulses. For example, a time division multiplexed demodulator or interrogator may determine the signal of the sensor element from the only optical path difference matched returning beam couple as described herein.

Figure 5:
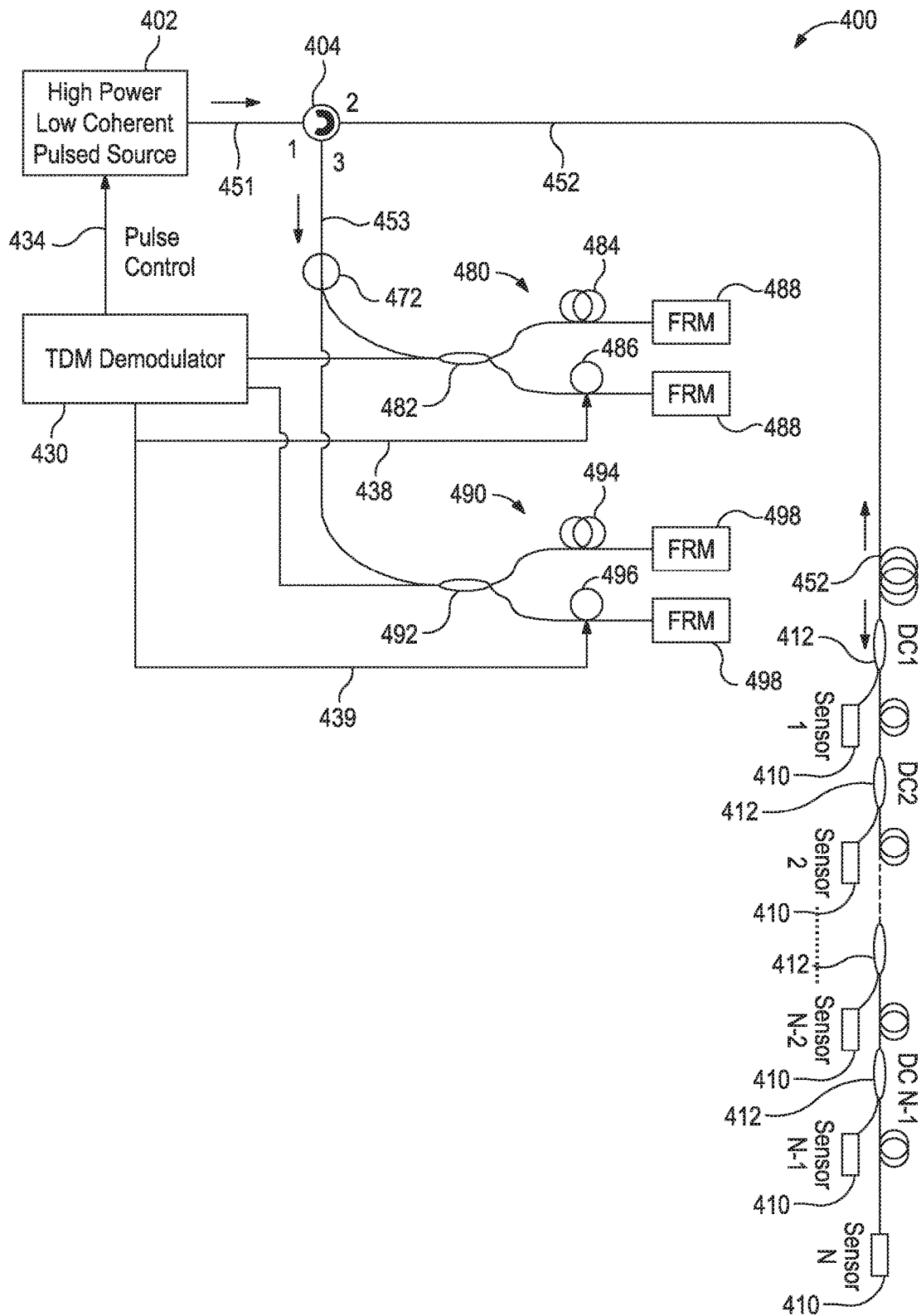
FIG. 5 is a diagram of another example of a multiplexed microvolt sensor system in accordance with aspects of the present disclosure.

FIG. 5 provides another example of a multiplexed microvolt sensor system 400. The system 400 may be characterized as a coherence domain multiplexing scheme. In this regard, a second compensating interferometer may be utilized having a different path mismatch than the first compensator interferometer.

In the illustrated system 400 of FIG. 5, like reference numbers correspond to like numbers in system 100 (e.g., reference element 4xx is the same or similar to 1xx). The system 400 may further include a splitter 472 for dividing the returning/reflected optical signals to both of a first compensating interferometer 480 and a second compensating interferometer 490. Additionally, an array of sensor elements 410 in system 400 comprises a first set of sensor elements 410 and a second set of sensor elements 410. The first set of sensor elements 410 may be ordered consecutively and the second set of sensor elements 410 ordered consecutively thereafter (e.g., first set of sensor elements 410 being Sensor 1, Sensor 2, . . . and Sensor X; and the second set of sensors elements 410 being Sensor X+1, . . . Sensor N−1, and Sensor N). In other implementations, the first set and the second set of sensor elements 410 may alternate consecutively or be interleaved in the array of sensor elements 410.

With additional reference to FIG. 2, each electro-optical modulator 220 in the first set of sensor elements 410 may comprise a first-set sensing interferometer comprising a first waveguide channel arm 221 and a second waveguide channel arm 222 that may be longer than the first waveguide channel arm 221 by a first-set distance (e.g. 2 mm). Each electro-optical modulator 220 in the second set of sensor elements 410 may comprise a second-set sensing interferometer comprising a first waveguide channel arm 221 and a second waveguide channel arm 222 that may be longer than the first waveguide channel arm 221 of the second set of sensor elements by a second-set distance (e.g., 4 mm) so that the second-set distance may be greater that the first-set distance.

The first compensating interferometer 480 may comprise a 2×2 directional coupler 482 for providing a compensating path difference that may be approximately equal to a path difference in the electro-optical modulator 220 (e.g., the sensing interferometer) corresponding to the first waveguide channel arm 221 and the second waveguide channel arm 222 of the first set of sensor elements 410. For example, a first compensating waveguide path 484 may be provided by a length of fiber. The first compensating waveguide path 484 may include a reflector 488 (e.g., a faraday rotator mirror (FRM)). A second compensating waveguide path 486 may comprise a phase modulator. The phase modulator may include a loop of the fiber providing the waveguide path that may be wrapped around a piezoelectric disk, in accordance with certain embodiments. The second compensating waveguide path 486 may also include a reflector 488 (e.g., an FRM).

The optical path difference (OPD) of the first compensating interferometer 480 may be matched with difference between channel arm lengths of the first waveguide channel arm 221 and the second waveguide channel arm 222 in the electro-optical modulator 220 of the first set of sensor elements 410.

The second compensating interferometer 490 may comprise a 2×2 directional coupler 492 for providing a compensating path difference that may be approximately equal to a path difference in the electro-optical modulator 220 (e.g., the sensing interferometer) corresponding to the first waveguide channel arm 221 and the second waveguide channel arm 222 of the second set of sensor elements 410. For example, a first compensating waveguide path 494 may also be provided by a length of fiber (e.g., whereby first compensating waveguide path 494 of the second compensating interferometer 490 may be longer than the first compensating waveguide path 484 of the first compensating interferometer 480). The first compensating waveguide path 494 may include a reflector 498 (e.g., an FRM). A second compensating waveguide path 496 may comprise a phase modulator. The phase modulator may include a loop of the fiber providing the waveguide path that may be wrapped around a piezoelectric disk, in accordance with certain embodiments. The second compensating waveguide path 496 may also include a reflector 498 (e.g., an FRM).

The OPD of the second compensating interferometer 490 may be matched with difference between channel arm lengths of the first waveguide channel arm 221 and the second waveguide channel arm 222 in the electro-optical modulator 220 of the second set of sensor elements 410.

Time division multiplexed demodulator 430 may be operatively coupled to both the first compensating interferometer 480 and the second compensating interferometer 490. The time division multiplexed demodulator 430 may also provide a first phase generated carrier (PGC) control signal 438 for compensator modulation of the first compensating interferometer 480, and a second PGC control signal 439 for compensator modulation of the second compensating interferometer 490.

Other aspect of system 400 may be similar as those described with respect to system 100 and FIGS. 1-4 herein. Accordingly, a coherence domain multiplexing with time division multiplexed demodulation may be achieved in some embodiments. Thus, an increased number of sensor elements 410 may be deployed on a single fiber strand or optical path.

Embodiments disclosed herein include:

A. A system that includes a pulsed light source, a first optical waveguide segment operatively coupled to the pulsed light source, an optical circulator including a first port, a second port, and a third port, the first port being operatively coupled to the first optical waveguide segment, a second optical waveguide segment operatively coupled to the second port of the optical circulator, an array of sensor elements, each of the sensor elements including a detector and an electro-optical modulator, the electro-optical modulator operatively coupled to the second optical waveguide segment, a third optical waveguide segment operatively coupled to the third port of the optical circulator, a compensating interferometer operatively coupled to the third optical waveguide segment, and a time division multiplexed demodulator operatively coupled to the compensating interferometer and the pulsed light source.

B. A method that includes emitting an electromagnetic field into a subterranean formation for detection by a sensor element, the sensor element being coupled to an optical waveguide, transmitting a light pulse by a high-power, low-coherent pulsed light source having a coherence length shorter than a path difference of a sensing interferometer of a sensor element, and longer than a path difference matching error of a compensating interferometer and the path difference of the sensing interferometer, the light pulse being transmitted via the optical waveguide, and receiving two return light pulses via the optical waveguide from the sensor element, the two return light pulses being modulated based on detection of the electromagnetic field by the sensor element.

C. A well system that includes an interrogator system configured to generate a light pulse and receive a plurality of return light pulses, an optical waveguide operatively coupled to the interrogator system, and an array of sensor elements operatively coupled to an optical waveguide, the array of sensor elements being disposed proximal to an exterior of at least one of a casing or liner of a wellbore, each of the sensor elements including a detector and an electro-optical modulator, the electro-optical modulator being operatively coupled to the optical waveguide, wherein each of the electro-optical modulator includes a first waveguide channel arm and a second waveguide channel arm longer than the first waveguide channel arm.

Each of embodiments A, B, and C may have one or more of the following additional elements in any combination: Element 1: wherein pulsed light source is a high-power, low-coherent pulsed light source.

Element 2: wherein the pulsed light source includes a polarization element. Element 3: wherein the second optical waveguide segment is a single optical path. Element 4: wherein the detector is a coil of electrically conductive material. Element 5: wherein each of the electro-optical modulator except for a last electro-optical modulator in the array of sensor elements is operatively coupled to the second optical waveguide segment via a directional coupler. Element 6: wherein a last electro-optical modulator in the array of sensor elements is operatively coupled to the second optical waveguide via a direct connection to an end of the second optical waveguide. Element 7: wherein the electro-optical modulator includes a sensing interferometer. Element 8: wherein the sensing interferometer is a Lithium Niobate Michelson-type interferometer. Element 9: wherein the sensing interferometer includes a first waveguide channel arm and a second waveguide channel arm longer than the first waveguide channel arm. Element 10: wherein a distance by which the second waveguide channel arm is longer than the first waveguide channel arm is between 0.1 mm and 5.0 mm. Element 11: wherein the first waveguide channel arm has a proximal end with respect to the pulsed light source and a distal end at which a first reflective element is disposed, and the second waveguide channel arm has a proximal end with respect to the pulsed light source and a distal end at which a second reflective element is disposed. Element 12: wherein the sensing interferometer includes an ingress/egress waveguide channel including a proximal end with respect to the pulsed light source and a distal end that connects to the proximal end of the first waveguide channel arm and the proximal end of the second waveguide channel arm. Element 13: wherein the sensing interferometer includes a first electrode, a second electrode, and a third electrode, wherein the first waveguide channel arm is disposed between the first electrode and the second electrode, and wherein the second waveguide channel arm is disposed between the second electrode and the third electrode. Element 14: wherein the first electrode and the third electrode are electrically coupled to a first end of the detector, and wherein the second electrode is electrically coupled to a second end of the detector. Element 15: wherein the compensating interferometer is configured to provide a compensating path difference approximately equal to a path difference in the sensing interferometer corresponding to the first waveguide channel arm and the second waveguide channel arm. Element 16: further comprising an emitter configured to emit an electromagnetic field for detection by the array of sensor elements. Element 17: further comprising an additional compensating interferometer operatively coupled to the third optical waveguide segment and the time division multiplexed demodulator, and wherein the array of sensor elements includes a first set of sensor elements and a second set of sensor elements, wherein each electro-optical modulator in the first set of sensor elements includes a first-set sensing interferometer including a first waveguide channel arm having a proximal end with respect to the pulsed light source and a distal end at which a first reflective element is disposed, and a second waveguide channel arm longer than the first waveguide channel arm by a first-set distance, the second waveguide channel arm having a proximal end with respect to the pulsed light source and a distal end at which a second reflective element is disposed, and wherein each electro-optical modulator in the second set of sensor elements includes a second-set sensing interferometer including a first waveguide channel arm having a proximal end with respect to the pulsed light source and a distal end at which a first reflective element is disposed, and a second waveguide channel arm longer than the first waveguide channel arm of the second set of sensor elements by a second-set distance greater than the first-set distance, the second waveguide channel arm having a proximal end with respect to the pulsed light source and a distal end at which a second reflective element is disposed.

Element 18: further comprising directing the two return light pulses to the compensating interferometer, the compensating interferometer having two optical waveguide paths and two mirror assemblies for reflecting the two return light pulses, receiving four compensated return light pulses from the compensating interferometer, and determining a signal of the sensor element based on the four compensated return light pulses.

Element 19: wherein the array of sensor elements operatively coupled to the optical waveguide extends a distance greater than 1,500 meters. Element 20: wherein a distance between each sensor element in the array of sensor elements is between 10 meters and 50 meters.

By way of non-limiting example, exemplary combinations applicable to A, B, and C include: Element 7 with Element 8; Element 7 with Element 9; Element 9 with Element 10; Element 9 with Element 11; Element 11 with Element 12; Element 9 with Element 13; Element 13 with Element 14; Element 9 with Element 15.

Therefore, the disclosed systems and methods are well adapted to attain the ends and advantages mentioned as well as those that are inherent therein. The particular embodiments disclosed above are illustrative only, as the teachings of the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope of the present disclosure. The systems and methods illustratively disclosed herein may suitably be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces. If there is any conflict in the usages of a word or term in this specification and one or more patent or other documents that may be incorporated herein by reference, the definitions that are consistent with this specification should be adopted.

As used herein, the phrase "at least one of" preceding a series of items, with the terms "and" or "or" to separate any of the items, modifies the list as a whole, rather than each member of the list (e.g., each item). The phrase "at least one of" allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

What is claimed is:

1. A system comprising:
a pulsed light source;
a first optical waveguide segment operatively coupled to the pulsed light source;
an optical circulator comprising a first port, a second port, and a third port, the first port being operatively coupled to the first optical waveguide segment;
a second optical waveguide segment operatively coupled to the second port of the optical circulator;
an array of sensor elements including a first set of sensor elements, each sensor element comprising a first detector and a first-set electro-optical modulator, the first-set electro-optical modulator comprising a first-set sensing interferometer and operatively coupled to the second optical waveguide segment;
a third optical waveguide segment operatively coupled to the third port of the optical circulator;
a compensating interferometer operatively coupled to the third optical waveguide segment; and
a time division multiplexed demodulator operatively coupled to the compensating interferometer and the pulsed light source, wherein the first-set sensing interferometer comprises:
a first waveguide channel arm and a second waveguide channel arm longer than the first waveguide channel arm, and
a first electrode, a second electrode, and a third electrode, wherein
the first waveguide channel arm is disposed between the first electrode and the second electrode,
the second waveguide channel arm is disposed between the second electrode and the third electrode,
the first electrode and the third electrode are electrically coupled to a first end of the first detector, and
the second electrode is electrically coupled to a second end of the first detector.

2. The system of claim 1, wherein pulsed light source is a high-power, low-coherent pulsed light source.

3. The system of claim 1, wherein the pulsed light source comprises a polarization element.

4. The system of claim 1, wherein the second optical waveguide segment is a single optical path.

5. The system of claim 1, wherein the first detector is a coil of electrically conductive material.

6. The system of claim 1, wherein each of the first-set electro-optical modulator except for a last first-set electro-optical modulator in the array of sensor elements is operatively coupled to the second optical waveguide segment via a directional coupler.

7. The system of claim 1, wherein a last first-set electro-optical modulator in the array of sensor elements is operatively coupled to the second optical waveguide segment via a direct connection to an end of the second optical waveguide segment.

8. The system of claim 1, wherein the sensing interferometer is a Lithium Niobate Michelson-type interferometer.

9. The system of claim 1, wherein a distance by which the second waveguide channel arm is longer than the first waveguide channel arm is between 0.1 mm and 5.0 mm.

10. The system of claim 1, wherein:
the first waveguide channel arm has a proximal end with respect to the pulsed light source and a distal end at which a first reflective element is disposed; and
the second waveguide channel arm has a proximal end with respect to the pulsed light source and a distal end at which a second reflective element is disposed.

11. The system of claim 10, wherein the first-set sensing interferometer comprises an ingress/egress waveguide channel comprising a proximal end with respect to the pulsed light source and a distal end that connects to the proximal end of the first waveguide channel arm and the proximal end of the second waveguide channel arm.

12. The system of claim 1, wherein the compensating interferometer is configured to provide a compensating path difference approximately equal to a path difference in the sensing interferometer corresponding to the first waveguide channel arm and the second waveguide channel arm.

13. The system of claim 1, further comprising:
an emitter configured to emit an electromagnetic field for detection by the array of sensor elements.

14. The system of claim 1, further comprising:
an additional compensating interferometer operatively coupled to the third optical waveguide segment and the time division multiplexed demodulator,
wherein the array of sensor elements further comprises a second set of sensor elements,
wherein the first waveguide channel arm has a proximal end with respect to the pulsed light source and a distal end at which a first reflective element is disposed, and the second waveguide channel arm is longer than the first waveguide channel arm by a first-set distance, the second waveguide channel arm having a proximal end with respect to the pulsed light source and a distal end at which a second reflective element is disposed, and
wherein each sensor element in the second set of sensor elements comprises a second-set sensing interferometer comprising a third waveguide channel arm having a proximal end with respect to the pulsed light source and a distal end at which a third reflective element is disposed, and a fourth waveguide channel arm longer than the third waveguide channel arm by a second-set distance greater than the first-set distance, the fourth waveguide channel arm having a proximal end with respect to the pulsed light source and a distal end at which a fourth reflective element is disposed.

15. A system comprising:
a pulsed light source;
a first optical waveguide segment operatively coupled to the pulsed light source;
an optical circulator comprising a first port, a second port; and a third port, the first port being operatively coupled to the first optical waveguide segment;
a second optical waveguide segment operatively coupled to the second port of the optical circulator;
an array of sensor elements, each of the sensor elements comprising a detector and an electro-optical modulator, the electro-optical modulator operatively coupled to the second optical waveguide segment;
a third optical waveguide segment operatively coupled to the third port of the optical circulator;
a first compensating interferometer operatively coupled to the third optical waveguide segment;
a time division multiplexed demodulator operatively coupled to the first compensating interferometer and the pulsed light source; and
a second compensating interferometer operatively coupled to the third optical waveguide segment and the time division multiplexed demodulator,
wherein the array of sensor elements comprises a first set of sensor elements and a second set of sensor elements,
wherein each electro-optical modulator in the first set of sensor elements comprises a first-set sensing interferometer comprising a first waveguide channel arm having a proximal end with respect to the pulsed light source and a distal end at which a first reflective element is disposed, and a second waveguide channel arm longer than the first waveguide channel arm by a first-set distance, the second waveguide channel arm having a proximal end with respect to the pulsed light source and a distal end at which a second reflective element is disposed, and
wherein each electro-optical modulator in the second set of sensor elements comprises a second-set sensing interferometer comprising a first waveguide channel arm having a proximal end with respect to the pulsed light source and a distal end at which a first reflective element is disposed, and a second waveguide channel arm longer than the first waveguide channel arm of the second set of sensor elements by a second-set distance greater than the first-set distance, the second waveguide channel arm having a proximal end with respect to the pulsed light source and a distal end at which a second reflective element is disposed.

* * * * *